United States Patent

[11] 3,619,525

[72] Inventor Roy H. Sjoberg, Jr.
Orchard Lake, Mich.
[21] Appl. No. 67,745
[22] Filed Aug. 28, 1970
[45] Patented Nov. 9, 1971
[73] Assignee General Motors Corporation
Detroit, Mich.

[54] STEERING WHEEL CUSHION INSTALLATION
3 Claims, 5 Drawing Figs.
[52] U.S. Cl..................................................... 200/61.55,
200/159 B
[51] Int. Cl........................................................ H01h 9/00
[50] Field of Search..................................200/61.54–61.57,
159 B

[56] References Cited
UNITED STATES PATENTS
1,801,551 4/1931 Geyer........................... 200/61.55
3,054,879 9/1962 Soreng .......................... 200/159 B
3,517,145 6/1970 Wallace......................... 200/61.57

Primary Examiner—David Smith, Jr.
Attorneys—W. E. Finken and D. L. Ellis

ABSTRACT: An improved vehicle steering wheel cushion installation, the installation including a cushion assembly having separated resilient inner and outer pads covered by a relatively solid skin which forms a self-biased hinge connecting the inner pad to the outer pad for reciprocating movement relative thereto. The outer pad of the cushion assembly is secured to the steering wheel generally over the spokes thereof and the self-biased hinge normally maintains the inner pad in a retracted position wherein a first switch terminal on the inner pad is spaced from a second switch terminal on the steering wheel. Pressure on the cushion assembly over the inner pad initiates movement of the latter against the hinge bias to an extended position wherein the two switch terminals make contact to complete the vehicle horn circuit.

PATENTED NOV 9 1971 3,619,525
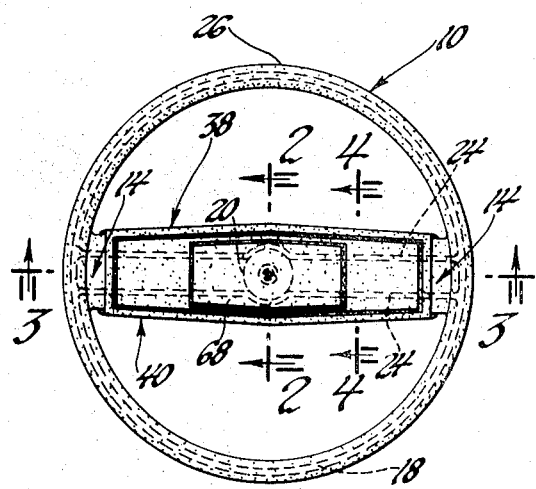
Fig. 1
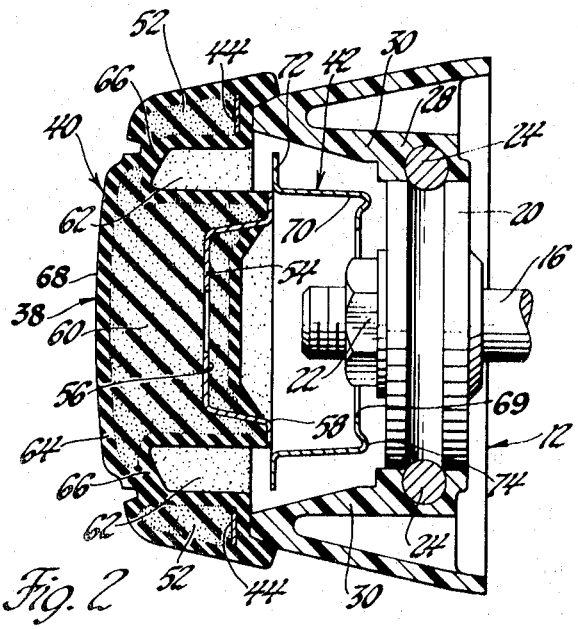
Fig. 2
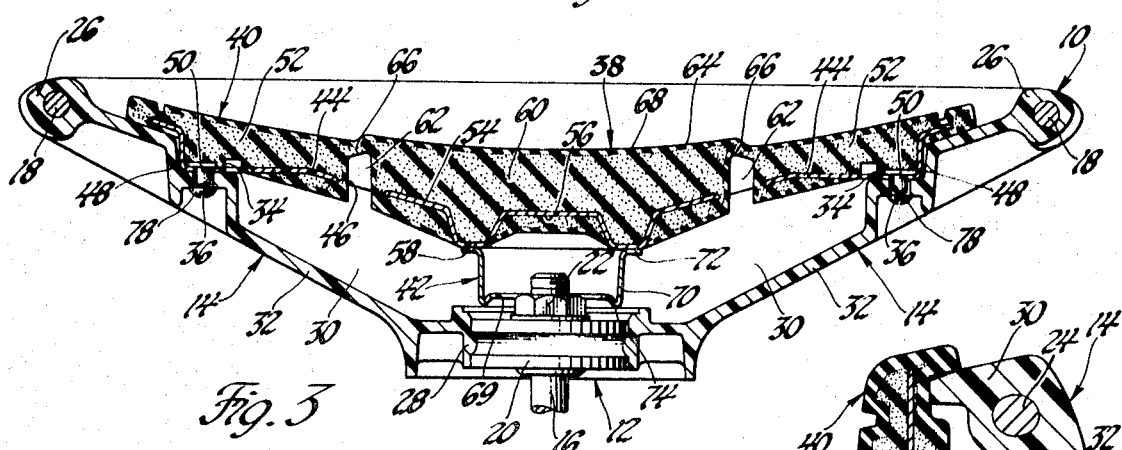
Fig. 3
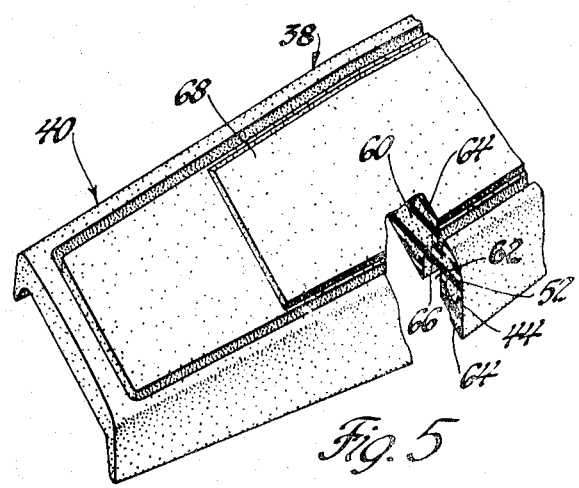
Fig. 5
Fig. 4
INVENTOR.
Roy H. Sjoberg, Jr.
BY
D. L. Ellis
ATTORNEY

3,619,525

STEERING WHEEL CUSHION INSTALLATION

This invention relates generally to steering wheels and more particularly to an improved steering wheel cushion installation.

Automotive steering wheels commonly have cushions over either the hub or the spokes to cushion impacts thereagainst. Recently the trend has been to combine the hub and the spoke cushions into a single unit extending across the center of the wheel. Such an arrangement, while having significant advantages, complicates the vehicle horn-actuating arrangement because some provision must be made for installing the horn switch on the cushion. Typically, the result is a complicated structure with a plurality of small push buttons protruding through the cushion or an arrangement wherein the entire cushion is incorporated into the horn switch mechanism in a manner permitting limited tilting of the cushion relative to the steering wheel. A steering wheel cushion installation according to this invention combines a highly simplified horn switch arrangement with a fixed cushion assembly thereby to effect maximum impact cushioning with a minimum of manufacture, service, and installation expense.

The primary feature of this invention is that it provides a new and improved vehicle steering wheel cushion installation including a cushion assembly having resilient inner and outer pads joined in spaced relationship by a self-biased hinge, the outer pad being secured to the steering wheel and the inner pad carrying one switch terminal normally biased apart from another switch terminal by the self-biased hinge. Another feature of this invention resides in the provision of a relatively solid skin enclosing both the inner and the outer pads, the skin forming the self-biased hinge which flexes in response to pressure applied on the inner pad thereby to permit reciprocation of the inner pad relative to the outer pad and momentary contact between the switch terminals. A still further feature of this invention resides in the provision of a cushion assembly wherein the inner and outer pads are fabricated from an integral skin foamable urethane, the inner and outer pads being of cellular construction with a solid integral skin therearound of the same composition, the skin forming a self-biased hinge connecting the inner and outer pads for reciprocation of the former relative to the latter.

These and other features of this invention will be readily apparent from the following specification and from the drawings wherein:

FIG. 1 is a plan view of an automobile steering wheel having a cushion installation according to this invention;

FIG. 2 is an enlarged sectional view taken generally along the plane indicated by lines 2—2 in FIG. 1;

FIG. 3 is an enlarged sectional view taken generally along the plane indicated by lines 3—3 in FIG. 1;

FIG. 4 is an enlarged sectional view taken generally along the plane indicated by lines 4—4 in FIG. 1; and FIG. 5 is a partially broken away perspective view of a cushion assembly from a steering wheel cushion installation according to this invention.

Referring now to FIGS. 1 and 2 of the drawings, there is shown an automobile steering wheel having a circular rim portion 10, a hub portion 12 and a pair of spoke portions 14 interconnecting the hub and the rim portions. The steering wheel is adapted to be rigidly mounted on one end of a steering shaft 16 which is operatively connected to the vehicle steering gear. When mounted on the steering shaft, the steering wheel is functional in a conventional manner to control the direction of movement of the vehicle.

As best seen in FIGS. 2, 3, and 4, the steering wheel has a steel reinforcing skeleton including a reinforcing rod member 18 formed into a circle of diameter generally equal to the diameter of rim portion 10. The reinforcing skeleton further includes a steel hub 20 having a central splined aperture, not shown, extending therethrough. The splines in the hub are adapted to engage splines on the steering shaft so as to mount the hub 20 on the shaft for unitary rotation therewith. The hub 20 is restrained axially on the steering shaft 16 by a nut 22 threadedly received on the end of the shaft. The skeleton of the steering wheel is completed by a pair of steel reinforcing stringers 24 extending in spaced and parallel relation across the circle defined the reinforcing rod member 18 and rigidly interconnecting the latter and hub 20.

To complete the steering wheel, a body of plastic or hard rubber is molded around the reinforcing skeleton to provide a gripping rim 26 around reinforcing member 18 and a decorative covering 28 around the steel hub 20. As seen best in FIGS. 2, 3, and 4, the plastic or hard rubber is molded around the reinforcing stringers 24 to impart to the spoke portions 14 a generally U shape. Each U-shaped spoke portion includes a pair of generally vertical sides 30 enclosing a corresponding one of the stringers 24 and an integral interconnecting web 32. Each web 32 is formed into a step at its outer end to provide a flat mounting surface 34 through which extends a clearance aperture 36. The steering wheel further includes a cushion installation according to this invention and generally designated 38, FIG. 1, the function of which is to protectively conceal the hub portion 12 and spoke portion 14 of the steering wheel.

Referring particularly to FIGS. 2 through 5, the cushion installation 38 includes a protective cushion assembly 40 and a horn switch terminal 42. The protective cushion assembly includes a primary steel reinforcing plate 44 which is of generally rectangular configuration and which has a centrally located rectangular aperture 46 therein, FIG. 3. As best seen in FIG. 4, the primary reinforcing plate is of width generally equal to the distance between vertical sides 30 of the steering wheel spoke portions 14 and, as best seen in FIG. 3, has a step 48 formed therein at each end so as to dovetail with the steps formed in the webs 32. A pair of internally threaded studs 50 are rigidly fastened to the primary reinforcing plate adjacent the steps 48 and project generally perpendicularly to the plane of the plate. A resilient, protective outer pad 52 generally overlies the primary reinforcing plate 34 and extends somewhat around to the lower surface thereof except in the areas adjacent the studs 50 so that a pair of exposed bearing surfaces are provided for mounting the cushion assembly on the steering wheel as described hereinafter.

Centered generally within the aperture 46 in the primary reinforcing plate is a separate and distinct secondary reinforcing plate 54 having a circular indentation 56 merging into a circular flange 58. A resilient protective inner pad 60 overlies and electrically insulates the secondary reinforcing plate 54 and extends somewhat around to the lower surface thereof except in the area of flange 58. As best seen in FIGS. 2 and 3, the inner pad 60 is surrounded on all sides by the outer pad 52 and is separated therefrom by a generally rectangular channel 62.

As best seen in FIGS. 2 through 5, the inner and outer pads are virtually completely enclosed by a relatively solid skin 64 which provides a resilient, decorative, and wear-resistant cover for the protective cushion assembly. The skin 64 spans the channel 62 between the inner pad 60 and the outer pad 52 and is formed in the area above the channel into a hinge 66. The hinge 66 supports the inner pad on the outer pad for reciprocating movement between a retracted position, FIG. 3, and an extended position, not shown, somewhat closer to hub 20. The hinge 66 extends completely around the inner pad 60 and, due to the nature of the material from which it is fabricated, exhibits a self-biasing characteristic which resiliently maintains the hinge in the position in which it was originally formed. The hinge 66 thus resiliently urges the inner pad toward the retracted position. A slightly raised surface 68 is formed on the exposed side of the cushion assembly 40 and generally defines an area overlying the inner pad 60.

In the preferred embodiment shown in the drawings, the inner and outer pads are fabricated from integral skin foamable urethane. The inner and outer pads exhibit a resilient cellular structure while the skin 64, integral with each, is relatively solid yet of the same composition. The solid skin spans the channel 62 and is molded into the hinge structure 66, the characteristics of the skin composition producing an internal resilience sufficient to support inner pad on the outer pad in the retracted position. More particularly, satisfactory results have been obtained with a cushion assembly wherein the pads and skin are the reaction product of a diphenyl methane diisocyanate, a polyether Triol preferably of molecular weight 4,500, a low molecular weight Diol, an amine-type catalyst, a silicone surfactant, a tin catalyst, and a low boiling point liquid blowing agent. It will, of course, be apparent to those skilled in the art that a color pigment could be added to the above reactants to impart a desired color to the cushion assembly.

As seen best in FIGS. 2 and 3, the aforementioned horn switch terminal 42 is a metallic, electrically conductive circular cup having an aperture 69 in the bottom thereof and a sidewall 70 merging on top into a circular flange 72 and on the bottom into a circular contacting lip 74. The flange 72 abuts the exposed flange 58 on the secondary reinforcing plate and is rigidly fastened thereto by conventional means, such as spotwelding, riveting and the like, for unitary movement with the inner pad.

The protective cushion assembly 40, with the horn switch terminal 42 thereon, is rigidly secured to the steering wheel in generally overlying relation to spoke portions 14. In particular, as best seen in FIG. 3, the exposed surfaces of the primary reinforcing plate 44 adjacent the studs 50 abut respective ones of the mounting surfaces 34 on the webs 32 of the spoke portions 14 with respective ones of the studs 50 projecting into apertures 36. A screw 78 is threadedly received in each of the studs and tightly secures the cushion assembly to the spoke portions with inner pad 60 generally overlying hub portion 12 and steering shaft 16 and nut 22 projecting into aperture 69 in the horn switch terminal. As best seen in FIG. 4, in the mounted position of the cushion assembly 40, the primary reinforcing plate 44 spans the distance between vertical sides 30 of the spoke portions 14 to thus provide support for that portion of the outer pad located above the webs 32.

Conventional electrical circuit means, not shown, are provided on the vehicle body and function to maintain the electrically insulated switch terminal 42 at an electrical potential relative to the vehicle body. Such means, of course, might include an insulated contacting element on the steering wheel engaging both the terminal 42 and an insulated stationary plate on the vehicle body wired in series with one terminal of the vehicle battery and with the horn.

As best seen in FIG. 3, the self-biased hinge 66 normally maintains the lip 74 of the horn switch terminal 42 in spaced relation to the steel hub 20 which is electrically connected to the other terminal of the vehicle battery through the steering shaft and the vehicle body. When it is desired to actuate the vehicle horn, it is necessary only to press anywhere on the raised surface 68. The pressure on the raised surface initiates flexure of the hinge 66 and reciprocation of the inner pad relative to the outer pad from the retracted to the extended position, thus bringing lip 74 into engagement with steel hub 20 to complete the horn circuit and actuate the horn. When pressure is removed from the raised surface, the self-biased hinge urges the inner pad back to the retracted position, thus lifting the switch terminal 42 and interrupting the horn circuit.

In the event of an impact on the cushion assembly at a location above the outer pad 52, the primary reinforcing plate 44, spanning the vertical sides 30 of the spoke portions 14, supports the outer pad and renders the latter operative to effectively cushion or soften the impact. If the impact is on the raised surface 68 of the cushion assembly, the initial result is flexure of hinge 66, movement of the inner pad 60 from the retracted to the extended position, and actuation of the horn as described hereinbefore. Contact between the switch terminal 42 and the hub 20, however, prevents further movement of the terminal and the secondary reinforcing plate 54. So positioned, the secondary reinforcing plate is operative to resist movement of the inner pad which then functions in a manner similar to that described in connection with the outer pad to cushion the impact which initiated the sequence of movement. Thus, the cushion assembly remains functional under all circumstances to effectively cushion impacts on the steering wheel.

Having thus described the invention, what is claimed is:

1. In combination with a vehicle steering wheel including a rim portion, a hub portion and spoke portions interconnecting said hub and said rim portions, a horn-actuating impact cushion installation comprising, a resilient primary pad having an opening therein to receive a horn-actuating pad, means fixedly securing said primary pad to said steering wheel, a resilient horn-actuating pad situated within said opening in said primary pad, said horn-actuating pad being predeterminately smaller in size than said opening in said primary pad thereby to provide a space between the former and the latter, a cover of relatively dense resilient decorative material fixed to each of said primary and said horn-actuating pads and defining an integral span portion interconnecting said primary and said horn-actuating pads, said span portion of said cover providing a hinge supporting said horn-actuating pad on said primary pad for movement relative to the plane of said primary pad between a normal position and an extended horn-actuating position, the material of said cover and said integral span portion being self-sustaining as to form so that said span portion is operative to solely resiliently maintain said horn-actuating pad in said normal position thereof, and switch means mounted on said horn actuating pad and adapted for connection in a horn-actuating circuit in a manner responsive to movement of said horn-actuating pad from said normal to said extended position to complete said circuit.

2. In combination with a vehicle steering wheel including a rim portion, a hub portion and spoke portions interconnecting said hub and said rim portions, a horn-actuating impact cushion installation comprising, a cushion assembly including a resilient primary pad and a resilient horn-actuating pad predeterminedly smaller than and situated in an opening in said primary pad and further including a relatively more dense decorative cover integral with said primary and said horn-actuating pads and defining an integral span portion interconnecting said primary and said horn-actuating pads, said span portion of said cover providing a hinge supporting said horn-actuating pad on said primary pad for movement relative to the plane of said primary pad between a normal position and an extended horn-actuating position, the material of said primary and said horn-actuating pads and said integral cover being self-sustaining as to form so that said span portion is operative to solely resiliently maintain said horn-actuating pad in said normal position thereof, means interconnecting said steering wheel and said primary pad thereby to support said cushion assembly on said steering wheel, and switch means mounted on said horn-actuating pad and adapted for connection in a horn-actuating circuit in a manner responsive to movement of said horn-actuating pad from said normal to said extended position to complete said circuit.

3. In a vehicle having a steering shaft and a steering wheel including a hub portion adapted for mounting on said steering shaft and a rim portion connected to said hub portion by a plurality of rigid spoke portions, a horn-actuating impact cushion installation comprising, a primary reinforcing plate having an aperture therein, a secondary reinforcing plate smaller than and situated generally within said aperture in said primary reinforcing plate, integral skin foamable urethane cushion means defining a cellular and resilient primary pad over said primary reinforcing plate and a separate cellular and resilient horn-actuating pad over said secondary reinforcing plate, each of said primary and said horn-actuating pads being enveloped in an integral relatively more dense decorative cover of the same composition as said primary and said horn-actuating pads and defining therebetween an integral span portion supporting said horn-actuating pad and said secondary reinforcing plate on said primary pad and said primary reinforcing plate for movement relative to the plane of said primary pad between a normal position and an extended horn-actuating position, the material of said primary and said horn-actuating pads and said integral cover being self-sustaining as to form so that said span portion is operative to solely resiliently maintain said horn-actuating pad in said normal position thereof, means mounting said primary reinforcing plate on said steering wheel with said primary pad generally overlying said spoke portions of said steering wheel, and switch means mounted on said horn-actuating pad and adapted for connection in a horn-actuating circuit in a manner responsive to movement of said horn-acutating pad from said normal to said extended position to complete said circuit.

* * * * *